United States Patent [19]

Reader et al.

[11] 4,311,509

[45] Jan. 19, 1982

[54] APPARATUS FOR CONVEYING GLASS SHEETS

[75] Inventors: William D. Reader, Altoona; Terry L. Wolfe, Tyrone, both of Pa.

[73] Assignee: PPG Industries, Inc., Pittsburgh, Pa.

[21] Appl. No.: 191,470

[22] Filed: Sep. 26, 1980

[51] Int. Cl.³ .................................. C03B 27/04
[52] U.S. Cl. ...................................... 65/351; 65/273; 65/348; 29/116 R; 29/125
[58] Field of Search .................. 65/273, 348, 351; 29/116 R, 125

[56] References Cited

U.S. PATENT DOCUMENTS

| | | | |
|---|---|---|---|
| 1,156,386 | 10/1915 | Armstrong | 308/20 |
| 1,516,083 | 11/1924 | Curtis | 308/20 |
| 1,927,849 | 9/1933 | Roberts | 26/63 |
| 2,828,852 | 4/1958 | Lorig | 198/127 |
| 2,948,384 | 8/1960 | Pate | 198/192 |
| 3,213,513 | 10/1965 | Robertson | 29/116 R |
| 3,308,519 | 3/1967 | Westgate | 29/116 R |
| 3,485,618 | 12/1969 | Ritter, Jr. | 65/273 |
| 3,550,758 | 12/1970 | Stalker | 198/192 |
| 3,763,992 | 9/1973 | Klenk | 198/127 |
| 3,799,752 | 3/1974 | Cheron | 65/351 |
| 3,918,774 | 11/1975 | Nicholson | 308/187 |
| 3,961,737 | 6/1976 | Fatula | 226/192 |
| 4,033,497 | 7/1977 | Przygocki | 226/194 |
| 4,203,754 | 5/1980 | Potier | 65/273 |
| 4,226,608 | 10/1980 | McKelvey | 65/273 X |

*Primary Examiner*—Arthur D. Kellogg
*Attorney, Agent, or Firm*—Edward I. Mates

[57] ABSTRACT

A conveyor roll for conveying glass sheets and a conveyor comprising a plurality of said conveyor rolls is described. Each conveyor roll comprises a curved shaft conforming to the shape of said glass sheets transverse to their path of movement, a plurality of hubs of essentially cylindrical configuration mounted around said curved shaft and having loosely interfitting tongues and grooves and a cylindrically shaped collar of a material that does not mar glass in tightly fitting relation about each of said hubs. When torque is applied to one of the end hubs of said conveyor rolls, the glass engaging surfaces of said collars rotate in unison at a uniform peripheral speed to convey the curved glass sheets through a cooling area included in glass sheet tempering apparatus with minimum scuff marks because the different collar surfaces rotate at the same rotational speed against the engaged surfaces of said curved glass sheets.

14 Claims, 5 Drawing Figures

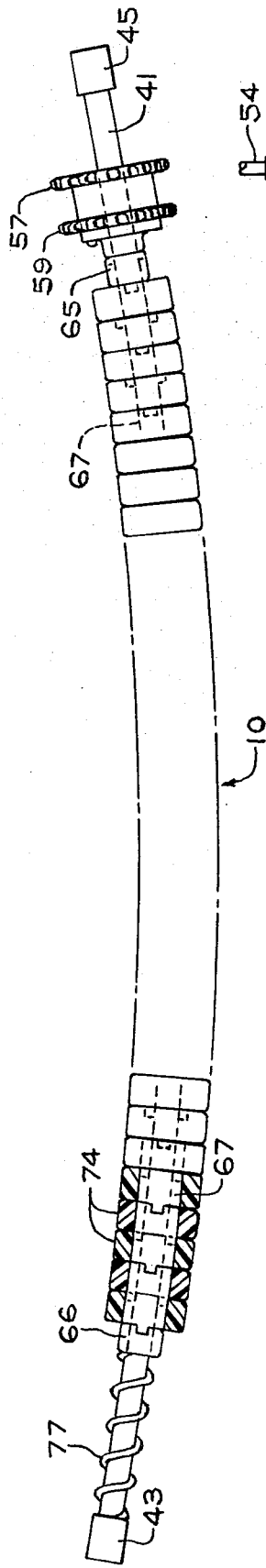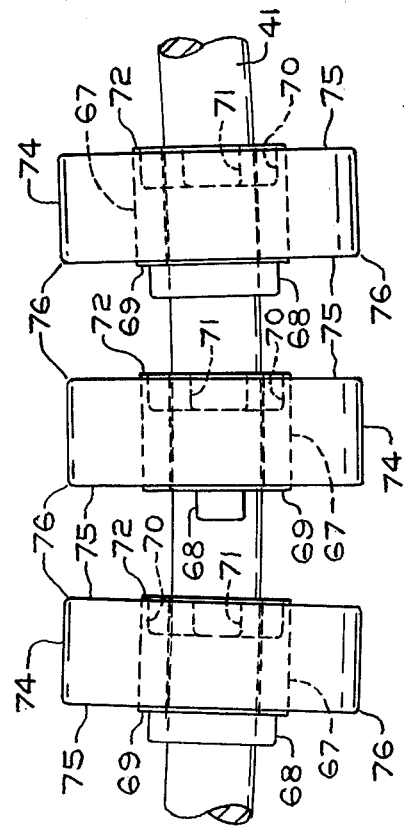
FIG. 3
FIG. 4
FIG. 5

APPARATUS FOR CONVEYING GLASS SHEETS

BACKGROUND OF THE INVENTION

1. Field of the Invention

This invention relates to conveying glass sheets and particularly those that have just been heated to a temperature sufficient for tempering or shaping and tempering and are being delivered to a cooling area where cold tempering medium is applied toward the opposite major surfaces of said curved glass sheets at a rate of flow and pressure sufficient to impart at least a partial temper in the curved glass sheets. This invention also may find use in providing curved rolls having a transverse curvature to which soft glass sheets sag while conveyed thereover.

When glass sheets are conveyed on a roller hearth through a tempering apparatus that includes a heating area, a shaping area and a cooling area in end to end relation to one another, it is important that the surface of the conveying rolls of the roller hearth be of a material capable of withstanding the heat in the area in which the rolls are installed and that does not mar the surface of the glass sheets that it engages. It is also important to minimize the relative sliding between the moving hot glass sheets and the rotating curved rolls that convey the hot glass sheets.

In the heating area, superior rolls, for conveying flat glass sheets by rotation until the sheets are heated sufficiently for shaping and tempering, are composed of a sintered fused silica material that is made by grinding solid fused silica into small particles and then sintering these particles to each other at a temperature below the fusing temperature. Such a material is readily formed into an elongated cylindrical shape required for the rolls of a roller hearth conveyor. In addition, fused silica rolls so formed have a relatively small coefficient of thermal expansion. This latter characteristic is extremely desirable due to the extreme temperature to which the rolls of the roller hearth in the heating area of the tempering apparatus are subjected during use.

Fused silica conveyor rolls of cylindrical shape are suitable for conveying flat glass sheets. However, they provide insufficient areas of support for curved glass sheets, so that glass sheets shaped transversely of the path of movement provided by a conveyor of fused silica rolls of cylindrical shape are free to sag out of their desired transverse shapes during their conveyance.

Furthermore, once the glass sheets are conveyed beyond the heating area on fused silica rolls, the need for rolls having such desirable properties at such elevated temperatures becomes less and it would be practical to use rolls suitable at lower glass engaging temperatures that are less expensive than the fused silica rolls most suitable in higher temperature atmospheres.

When glass sheets are shaped in a shaping area by roll forming as in U.S. Pat. No. 3,701,644 to Robert G. Frank or as in U.S. Pat. No. 4,139,359 to Randall S. Johnson and Terry L. Wolfe after being delivered to a roll forming station located downstream of the heating area where the roller hearth is located, or by press bending as in U.S. Pat. No. 4,015,968 to Robert G. Revells et al, for example, or by inertia sag bending as in U.S. Pat. No. 3,476,540 to George F. Ritter et al., and the curved glass sheets are returned to a conveyor for passage through a cooling area, the sheets must retain their shapes during their delivery through the cooling area. Also scuff marks should be prevented from forming on the surfaces of the curved glass sheets during the passage through the cooling area. The glass sheet tempering art would welcome relatively inexpensive and durable rolls for conveying curved glass sheets into and through the cooling area of a glass sheet tempering apparatus. The glass sheet shaping art would welcome less expensive curved shaping rolls than the solid ceramic rolls disclosed in the aforementioned Frank patent and in the aforementioned Johnson and Wolfe patent.

In addition to maintaining the shape of the curved glass sheets and avoiding the development of scuff marks in the shaping and/or cooling area, it is also desirable to have glass sheet conveyor rolls in the cooling area that occupy a minimum possible portion of the cooling area so as to provide minimum interference with the flow of cold tempering medium toward the opposite major surfaces of the curved glass sheets to be tempered.

2. Description of Patents of Interest

U.S. Pat. No. 1,156,386 to Armstrong discloses a belt idler comprising a bracket supporting a pair of upwardly inclined spindles with an idler pulley rotatably mounted about each of the spindles. The pulleys support the upper run of a V-shaped belt, which is supported on the idler pulleys. Each idler pulley rotates independently of the other idler pulley in response to friction from the moving belt. The belt would interfere with flow of tempering medium, so that this apparatus is not suitable to convey curved glass sheets through a cooling area of glass tempering apparatus.

U.S. Pat. No. 1,516,083 to Curtis discloses a roller conveyor comprising composite rolls of concave elevation. Each composite roll comprises five axles disposed in end to end relation, a roller on each axle, a hub for each roller, four supporting brackets (one for each joint) between adjacent hubs, and means to adjust the tightness between adjacent hubs. The bracket supports intermediate the ends of the composite rolls would inhibit the free flow and escape of tempering medium, if used to convey curved glass sheets through the cooling area of glass tempering apparatus.

U.S. Pat. No. 1,927,849 to Roberts discloses a cloth expander and guide that comprises a shaft device comprising companion shafts angularly related with their inner ends pivotally connected at the center of the shaft device. Such a device would not be suitable to convey curved glass sheets through the cooling area of glass tempering apparatus.

U.S. Pat. No. 2,828,852 to Lorig discloses a roller conveyor comprising certain self-centering rolls of special construction. The special rolls are mounted on a bent shaft and comprise a pair of generally frusto-conical shaped rolls or cylindrical rolls with tapered ends of smaller diameter mounted on the shaft with the small diameter ends adjacent each other. The rolls are connected to rotate at the same angular velocity. However, these rolls are not suitable for apparatus to temper curved glass sheets.

U.S. Pat. No. 2,948,384 to Pate discloses a belt conveyor comprising a plurality of rolls. Each roll includes a plurality of idler rollers mounted in spaced relation along the length of a flexible cable. The latter is stationarily fixed at its ends to a conveyor support framework. The flexible cable is tubular and provided with lubricating fittings for maintaining adequate lubrication for bearing assemblies incorporated in the idler rollers. This apparatus is not suitable for glass tempering.

U.S. Pat. No. 3,550,758 to Stalker discloses an idler roller for conveyor belts with special lubricating structure that includes spiral grooves formed in the sidewalls of each roller to help pressurize lubricant within the grooves when the roller rotates. This apparatus is also unsuitable for glass tempering.

U.S. Pat. No. 3,763,992 to Klenk discloses a conveyor of rollers that extend obliquely of a path of movement to force sheets transported thereover toward a guide at one side thereof. The obliquely extending rollers are driven by stub shafts that extend perpendicular to the path of movement through universal joints. A belt drives the stub shafts in unison. The obliquely extending rollers are of cylindrical shape and would not be suitable for use in conveying bent glass sheets.

U.S. Pat. No. 3,918,774 to Nicholson discloses bowed rolls for use in the paper or textile industries. The rolls comprise an elongated shaft, a series of spools disposed about the shaft for rotation and bearings between the shaft and the spools. Longitudinally split spacers separate adjacent bearings. Each spacer has its opposite ends tapered to abut against surfaces of the side walls of the inner races of said adjacent bearings that are complementarily tapered. There is no teaching of how this apparatus would be suitable to temper glass.

U.S. Pat. No. 3,961,737 to Fatula discloses a self-centering roll having two tubular end rim portions mounted on a straight shaft in spaced relation to one another. Means including a deflectable end web and an inner web including an eccentric hub, bearings mounted on the eccentric hub and a member eccentric with respect to the shaft axis mounted on the outside of the bearing concentric with the bearing axis cause the end rim portions to rotate on axes that intersect at a point intermediate the inner webs and are arranged at the same angle to the shaft axis. The roll of this patent is not curved to conform to the transverse shape of conveyed glass sheets.

U.S. Pat. No. 4,033,497 to Przygocki discloses a segmented billet roll provided with removable and axially adjustable segments having tongue and groove connections that interfit with one another and may be adjusted along the length of a central shaft to lengthen or shorten the length of the billet roll to accommodate for sheets of different widths. Set screws are provided to lock the position of each segment along the length of the central shaft. The billet roll is of cylindrical shape in cross-section for use in handling flat sheets. The tongues and grooves of adjacent segments interfit closely and make parallel sliding contact over the length of the billet roll. The tight, sliding fit limits the use of the interfitting segments to cylindrical rolls.

SUMMARY OF THE INVENTION

The present invention relates to curved conveyor rolls for conveying hot, flat glass sheets through a roll forming station and/or curved glass sheets into and through the cooling area of a glass sheet tempering apparatus. A conveyor comprising a plurality of said curved conveyor rolls defines a path of movement for the curved glass sheets through at least a portion of the roll forming station and/or the cooling area. The rolls extend transversely of said path and are spaced longitudinally along said path.

Each roll comprises a curved shaft having at least a portion thereof provided with an elevational shape conforming to the transverse shape of glass sheets transported thereover if located in the cooling area or the transverse shape to sag the hot glass sheets, if located in the roll forming station. A plurality of hubs of essentially cylindrical configuration is mounted around said curved shaft in end to end relation with one another from one end hub at one end of said plurality of hubs to another end hub at the other end of said plurality of hubs. The hubs (except for the end hubs) have tongues extending from one axial side wall that interfit loosely with grooves recessed within their opposite axial side wall to form loose tongue in groove couplings. One of the end hubs has tongues that extend to interfit loosely with grooves of its adjacent hub. The other end hub is recessed with grooves that loosely receive tongues extending from its adjacent hub.

A cylindrically shaped collar of a material that does not mar glass fits tightly around each of said hubs and is slightly shorter in axial length than the hub over which it fits snugly to allow freedom of movement between adjacent collars. Means is provided to apply a torque to one of the end hubs for transmission through said loose tongue and groove couplings to rotate said tubes at equal rotational speeds so as to avoid scuffing the glass sheets transported thereover in the roll forming station of glass sheet shaping apparatus or the cooling area of glass sheet tempering apparatus. In addition, the loose tongue and groove couplings between adjacent hubs permits a limited freedom of radial movement between said adjacent hubs, whereby the plurality of hubs and their associated collars form essentially cylindrically-shaped segments of a segmented roll whose outer surface conforms to the shape of the curved shaft.

The segments are usable with shafts of different curvatures that are needed to produce different shapes. Only one set of segments is needed for many different production patterns.

Conveyor rolls of the present invention may be very closely spaced, if located in a roll forming station. Close roll spacing minimizes distortion of the hot glass due to sagging.

These and other benefits of this invention will become obvious in the light of a description of a preferred embodiment thereof that follows.

BRIEF DESCRIPTION OF THE DRAWINGS

FIG. 3 is a plan view taken generally along the lines 3—3 of FIG. 1 of the portion of the cooling area containing a lower set of tempering nozzles and a plurality of conveyor rolls modified according to the present invention;

FIG. 4 is a longitudinal elevational view partly in section showing the details of the construction of a conveyor roll constructed according to the present invention; and FIG. 5 is an enlarged exploded view of a small portion of one of said rolls showing how elements of the rolls are oriented with respect to adjacent other elements in the construction depicted in the overall view in FIG. 4.

DESCRIPTION OF THE PREFERRED EMBODIMENT

The present invention relates to the novel construction of curved conveyor rolls 10 and conveyors comprising a plurality of such conveyor rolls that are especially useful when disposed along a conveyor that extends through a cooling area of apparatus for tempering curved glass sheets. It is understood, however, that the curved conveyor rolls 10 of the present invention may be employed elsewhere in glass sheet tempering apparatus or other glass sheet treatment or conveyor apparatus where it is desirable to convey shaped glass sheets on conveyor rolls having uniform rotational speeds along their entire axial lengths that engage the transverse dimension of the conveyed glass sheets transverse to the path of movement through the apparatus that treats the conveyed glass sheets. The specific embodiment of the present invention will be recited in an environment containing a cooling area of curved glass sheet tempering apparatus because the present invention is most suitable in such an environment.

Figure 1:
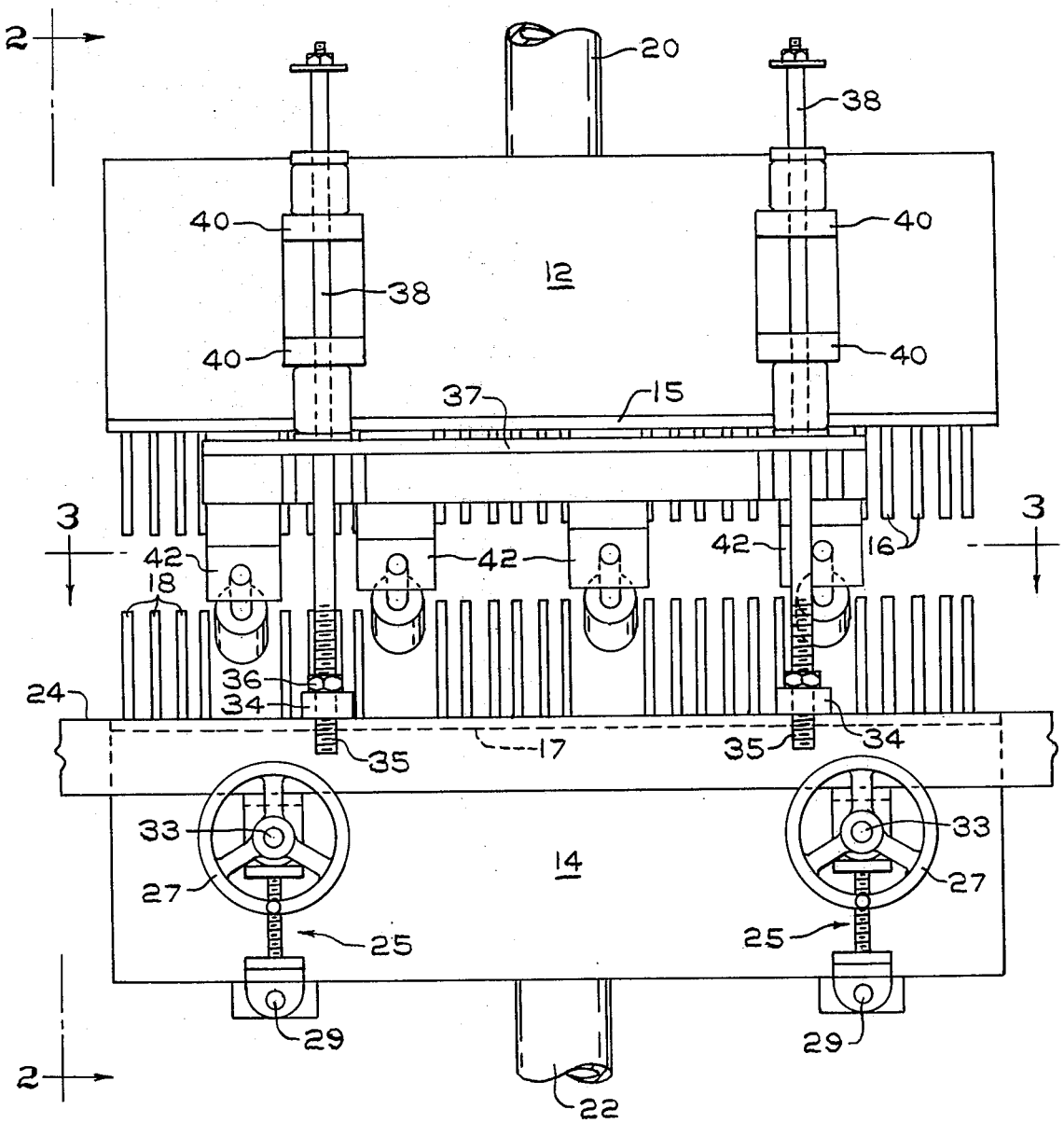
FIG. 1 is a longitudinal side view of a portion of a conveyor containing conveyor rolls modified according to the present invention.
Figure 2:
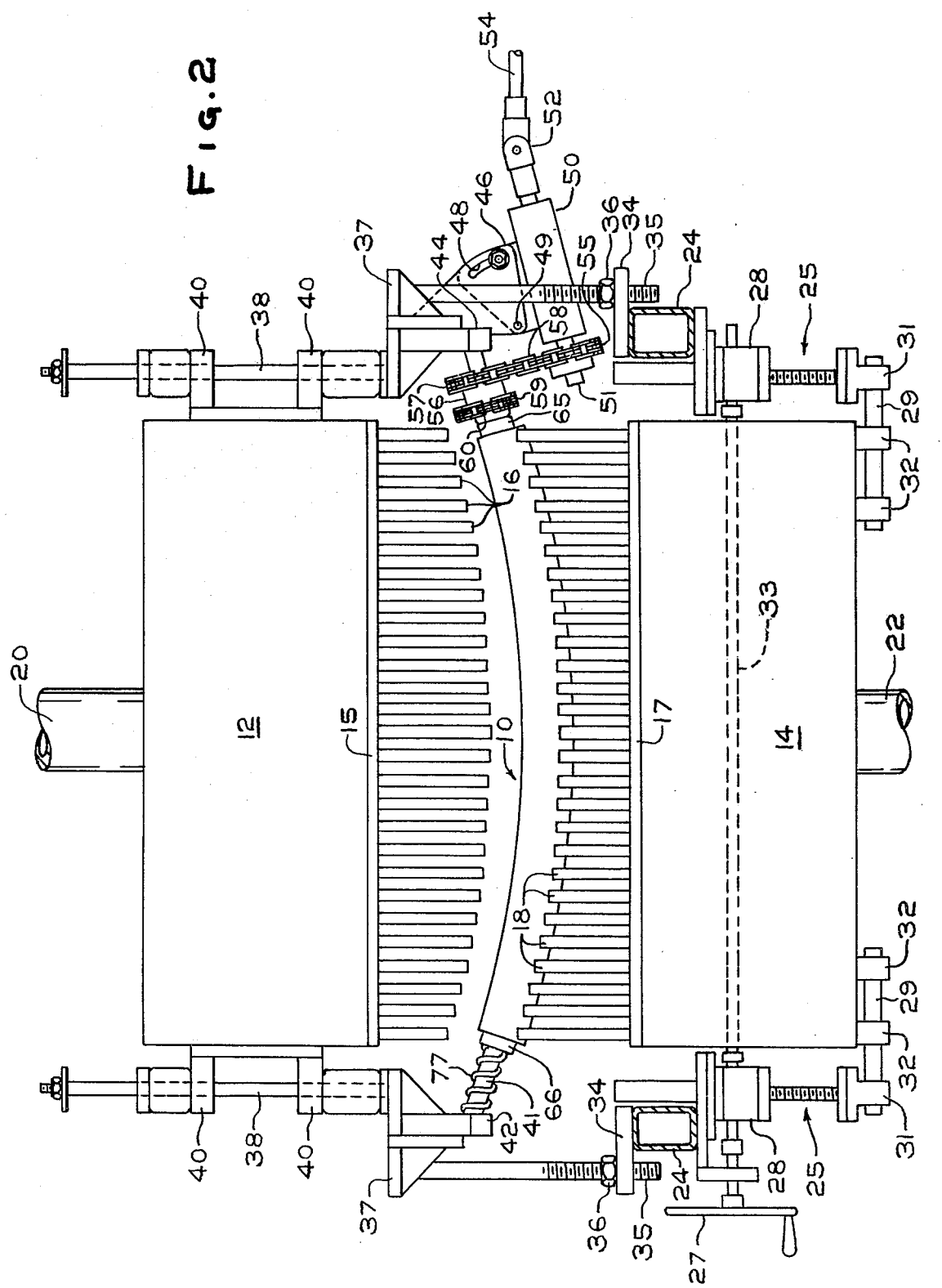
FIG. 2 is a cross-sectional view taken along the lines 2—2 at the entrance to a cooling area forming part of glass sheet tempering apparatus in which the conveyor of FIG. 1 is located.

With reference to FIGS. 1 and 2 of the drawings, the cooling area containing a plurality of longitudinally spaced transversely extending conveyor rolls 10 comprises an upper plenum 12 and a lower plenum 14. The upper plenum 12 has a lower apertured wall 15 provided with openings through which a plurality of upper nozzles 16 extend downwardly. Similarly, the lower plenum 14 has an upper apertured wall 17 through which a plurality of lower nozzles 18 extend upwardly.

A transversely curved space is provided between the lower ends of the upper nozzles 16 and the upper ends of the lower nozzles 18 by extending each individual nozzle from its associated apertured plate a distance such that its end is located in an upper or lower curved surface that defines the transversely curved space. A succession of glass sheets shaped to conform to the transverse curvature of the curved rolls 10 as depicted in FIG. 2 is transported between the upper nozzles 16 and the lower nozzles 18.

The upper plenum 12 is fed from an upper fluid supply conduit 20 and the lower plenum 14 receives tempering medium under pressure through a lower fluid supply conduit 22. The conduits communicate with a pump, fan or condenser (not shown) that supplies tempering medium under pressure. The fluid under pressure is imparted through the upper nozzles 16 and the lower nozzles 18 against the opposite surfaces of the curved glass sheets that are conveyed through the transversely curved space between the ends of the nozzles as the shaped glass sheets are transported through the cooling area as part of a tempering or heat-strengthening operation.

A pair of hollow horizontal beams 24 extend longitudinally on either side of the length of the cooling area. The vertical position of the horizontal beams 24 is controlled by longitudinally spaced elevator jacks 25 or other suitable support and adjustment mechanism. A plurality of cranks 27 is provided for adjusting each jack 25. A cross bar 29 extends through a sleeve 31 fixed to the bottom of each jack and through aligned sleeves 32 attached to the bottom of the lower plenum 14. The vertical position of the lower plenum 14 is adjusted by adjusting the jacks 25.

In order to avoid tilting the lower plenum 14, the crank 27 is connected to a horizontal crank shaft 33 that extends through the lower plenum 14 and is connected with a corresponding jack 25 through a pair of gear boxes 28 on either side of the lower plenum 14. Thus, rotating crank 27 moves both jacks 25 equal distances.

Apertured support plates 34 are supported on the horizontal support beams 24. Threaded shafts 35 are locked in adjustable position relative to the apertured support plates 34 by lock nuts 36. The upper ends of shafts 35 engage a pair of upper plenum support brackets 37. Each of the support brackets 37 supports a vertical guide rod 38, which is guided through sleeves 40 attached to the outer side walls of the upper plenum 12 to guide the vertical movement of the upper plenum relative to the position of the apertured support plates 26, which bear a fixed vertical position relative to the vertical position of the lower plenum 14. The upper plenum's position relative to the lower plenum 14 may be changed by adjusting the threaded shafts 35 and locking the vertical position thereof through suitable adjustment of the lock nuts 36.

The curved conveyor roll 10 comprises a curved shaft 41 received at one end in a bracket support 42, which receives an enlarged end 43 (FIG. 4) of the curved shaft 41. The latter may be either a solid rod or of tubular construction. Another bracket support 44 receives the other enlarged end 45 of the curved shaft 41. An adjustment bracket 46 containing walls, each having an arcuate groove 48, is connected to the bracket support 43 that receives the enlarged end 45 of the shaft 41. The adjustment bracket 46 is mounted on a pivot pin 49 (see FIG. 2).

The apparatus contains a drive shaft housing 50 for a drive shaft 51. The latter is connected through a flexible coupling 52 to a main drive shaft 54 connected to a motor (not shown). A sprocket 55 is mounted for rotation with the drive shaft 51. A double sprocket housing 56 is mounted around the end of the curved shaft 41 and has an outer sprocket 57 driven by a main chain drive 58.

The double sprocket housing 56 also contains an inner sprocket 59 which is connected by a chain drive 60 to the inner sprocket 59 of a double sprocket housing 61 mounted on the second curved conveyor roll 10 in a similar manner for driving its inner sprocket. Similarly, the outer sprocket 57 of double sprocket housing 61 of the second curved conveyor roll is connected through its outer sprocket 57 and an interconnecting chain drive 62 to the outer sprocket 57 of a double sprocket housing 63 of the third conveyor roll. An additional interconnecting chain drive interconnects the inner sprocket 59 of the third curved conveyor roll with corresponding inner sprocket 59 of the fourth curved conveyor roll 10, as is evident from a study of FIG. 3. This chain drive-double sprocket interconnection may be extended as far as is needed, depending on the number of special conveyor rolls in the system, and provides means to apply a torque to an end hub of each of a plurality of rolls in unison, as will be explained later.

An end male hub 65, having a smooth outer wall, is mounted around the right end of the curved shaft 41, as seen in FIG. 4. At the other end of the shaft, an end female hub 66 is mounted. Intermediate the end male hub 65 and the end female hub 66 is a plurality of intermediate hubs 67. Each of the hubs 67 has a tongue 68 (FIG. 5) extending axially outward from its male wall 69 and a pair of criss-crossing grooves 70 and 71 recessed within its female wall 72. A cylindrically-shaped collar 74 is press-fit to surround each of the intermediate hubs 67.

Each cylindrically-shaped collar 74 has a pair of parallel walls 75 that are recessed axially inward about 1 mil (0.025 mm) or so from the adjacent male wall 69 or female wall 72 of the intermediate hub 67 over which it is fitted. Furthermore, the radially outer ends of the parallel walls 75 are rounded at radially outer corners 76 to provide clearance between adjacent cylindrically shaped tubes. In addition, the tongues 68 have axial lengths approximately 30 mils (0.8 mm) longer and circumferential dimensions approximately 15 mils (0.4 mm) shorter than the corresponding dimensions of the criss-crossing grooves 70 and 71. These dimensional differences permit adjacent segments comprising the intermediate hubs 67 and the surrounding collars 74 to have loose tongue and groove connections when mounted along the length of the curved shaft 41.

The loose tongue and groove connections and the axial shortness of the segments enable the segments to be fit around curved shafts of considerably different shapes and still provide driving connections between adjacent segments with equal peripheral speeds for the segments. This feature minimizes relative sliding between conveyed glass sheets and the collars surrounding the hubs of the segments that are rotatably mounted around the curved shafts.

In assembling a roll 10, an end segment comprising an end male hub 65 or an end female hub 66 is mounted on one end of the curved shaft 41 and then segments comprising intermediate hubs 67 are mounted in end-to-end relation along the length of the curved shaft 41. Intermediate hubs 67 are mounted on the curved shaft 41 in alternate orientations so that the tongues 68 extending from one male wall 69 are oriented at angular relation to the tongues 68 extending from adjacent male walls 69. In other words, tongue 68 fits into the groove 70 of one intermediate hub 67 to provide a loose tongue in groove coupling between adjacent intermediate hubs and its tongue 68 fits loosely within the groove 71 of the next adjacent hub to provide the next loose tongue in groove coupling. Preferably, this alternating orientation extends along the length of the curved shaft 41. The other end segment contains an end female hub 66 if the first segment assembled onto the curved shaft 41 has an end male hub 65, and vice versa.

The loose fittings between the tongues and the grooves of adjacent hubs permits the segments comprising the hubs and the collars to adjust to the curved shape of the curved shaft 41 around which they are mounted, even if the shaft curvature differs along the length of the shaft or if the segments are mounted on shafts of different curvatures.

While not absolutely necessary, alternating the orientations of the tongues of adjacent intermediate hubs relative to the next adjacent hub provides a more positive rotational force when the end hub that is attached to the double sprocket housing 56 at one end of the curved conveyor roll 10 is rotated to transmit a torque through the segments along the entire length of the curved conveyor roll 10. Thus, the outer periphery of the segments defined by the outer periphery of the cylindrically-shaped collars 74 provides a uniform rotational speed throughout the length of the curved conveyor roll 10.

In order to have the segments in interfitting relation with one another along their axial lengths, a spring 77 is mounted around the curved shaft 41 between the enlarged end portion 43 and an adjacent end hub 65 or 66. The spring compresses the segments comprising the hubs and collars axially of the curved shaft 41 to help transmit the torque between adjacent segments along the length of the conveyor roll 10.

In a typical embodiment of this invention to produce glass sheets having a 76 inch (193 cm) radius of curvature, curved conveyor rolls 10 are mounted on curved steel shafts 41 having a diameter of ½ inch (1.27 cm) and a transverse central portion curved to a radius of 76 inches (193 cm) along a curved length of 24 inches (61 cm) and straight ends for mounting within shaft supporting brackets 42 and 44. Each of the hubs was formed of brass and had an axial length of ¾ inch (1.9 cm) with circumferential walls ¼ inch (6.35 mm) in radial thickness. Tongues ¼ inch (6.35 mm) long and ¼ inch (6.35 mm) wide fit in the axial direction into recesses 1/32 inch (0.8 mm) shorter than the tongues and having circumferentially extending, diametrically opposed grooves wider than the tongues to provide 1/32 inch (0.08 mm) clearance therebetween. The collars 74 surrounding the hubs 65, 66 and 67 were composed of a fiberglass reinforced epoxy resin believed to be a highly cured methyl phenyl silicone sold as Synthane G-7 electric board by the Synthane Taylor Company of Valley Forge, Pa. and had an inner diameter of 1 inch (2.54 cm.) to fit snugly around the hubs and an outer diameter of 2 inches (5.08 cm.). The rounding at the corners 76 of the collars 74 was infinitesimal, merely sufficient to avoid marking the glass due to the rotation at the corners of the collars of the segments forcing the glass sheet to move through the cooling area. Some of the adjacent rolls 10 were spaced on 6 inch (15.24 cm) centers and other adjacent rolls were spaced on 8 inch (20.32 cm) centers. Thus, the curved conveyor rolls were spaced longitudinally of each other a distance several times greater than the diameter of said curved conveyor rolls 10.

While the rolls just described are especially suitable for use in a cooling area of apparatus for tempering curved glass sheets, they are also suitable for use in higher temperature environments. Under such circumstances, the curved shafts 41 are preferably tubular rather than solid rod construction to permit the application of cooling fluid through the length of the shaft. The collars may be composed of quartz or other higher temperature resistant material. In addition, it may be desirable to enclose the rolls in sleeves of heat-insulating material, such as fiber glass and the like, to insulate the segments from direct contact with hot, moving glass sheets and to insulate the segments from direct exposure to the elevated temperature of the environment, in case the rolls are located in hotter portions of thermal treatment apparatus than the cooling area of glass sheet tempering apparatus.

When the apparatus is used to process glass sheets having a significantly differing curvature from those previously produced, it is not necessary to replace the entire roll structure. The segments can be used with a different set of curved shafts conforming to the different shape desired for the new production items, so no large inventory of segments is needed for replacement rolls. Sets of curved shafts for different shapes require much less storage space than complete sets of conveyor rolls.

The form of the invention shown and described in this specification represents an illustrative preferred embodiment thereof. It is understood that various changes may be made in number, dimensions, spacing and compositions of the hubs and collars, for example, without departing from the gist of the invention as defined in the claimed subject matter which follows.

We claim:

1. A conveyor roll for conveying glass sheets comprising:
   (a) a curved rigid shaft having at least a portion thereof provided with an elevational shape conforming to the transverse shape of glass;
   (b) means for supporting said curved shaft at its ends so that said curved portion extends transversely of a path of movement for said glass sheets;
   (c) a plurality of hubs of essentially cylindrical configuration mounted around said curved shaft in end to end relation with one another from one end hub at one end of said plurality of hubs to another end hub at the other end of said plurality of hubs, said hubs having loosely interfitting tongues and grooves at the axial ends of adjacent of said hubs that form loose interfitting tongue and groove couplings capable of transmitting a torque between adjacent of said hubs while permitting a limited freedom of axial movement between said adjacent hubs;
   (d) a cylindrically shaped collar of a material that does not mar glass in tightly fitting relation around each of said hubs;
   (e) means for applying a torque to one of said end hubs; and
   (f) means mounted around said shaft and against the other of said end hubs to bias said hubs in an axial direction sufficiently to retain a loosely fitting relation between said tongues and grooves and to enable said hubs to transmit a torque applied to said one end hub through said hubs to said other end hub, whereby said collars rotate in unison at a uniform peripheral speed.

2. A conveyor roll as in claim 1, wherein each of said hubs intermediate said end hubs is provided with a male wall having a pair of diametrically opposed tongues extending axially outward of said hub and a female wall having two pairs of diametrically opposed grooves extending axially inward of said hub, said tongues having given axial and circumferential dimensions, said grooves having circumferential dimensions slightly longer than said tongues and axial dimensions shorter than said tongues, whereby said tongues of each said hub fit loosely within corresponding grooves of said adjacent hub to enable said plurality of hubs to follow the curvature of said curved shaft when they are mounted with said tongues loosely interfitting with said grooves.

3. A conveyor roll as in claim 2, wherein the pair of tongues extending axially outward from said one of said hubs are received in said pair of said grooves extending axially inward from said adjacent hub at one orientation and said pair of tongues of said adjacent hub are received in said pair of said grooves of said next hub adjacent to said adjacent hub at a different orientation from said one orientation.

4. A conveyor roll as in claim 1 or claim 2 or claim 3, wherein said collars have slightly shorter axial lengths than their associated hubs.

5. A conveyor roll as in claim 4, wherein said collars have smooth circumferential surfaces with rounded axial end portions.

6. A conveyor roll as in claim 1, wherein said hubs are composed of brass.

7. A conveyor roll as in claim 1, wherein said collars are composed of a fiber glass reinforced epoxy resin.

8. A conveyor roll as in claim 1, wherein said curved rigid shaft is a solid rod.

9. A conveyor roll as in claim 1, wherein said curved rigid shaft is of tubular construction.

10. A conveyor roll as in claim 1, further including a sleeve of heat-insulating material of fiber glass or the like surrounding said conveyor roll.

11. A conveyor roll as in claim 1, wherein said collars are composed of quartz.

12. A conveyor for conveying glass sheets comprising a plurality of conveyor rolls as in claim 1 extending transversely of said path of movement for said glass sheets and longitudinally spaced from one another along said path, further including means to apply a torque to one of said end hubs of each of said plurality of said rolls to rotate said rolls in unison.

13. A conveyor as in claim 12, wherein said path of movement extends through a cooling area included in glass sheet tempering apparatus, further comprising nozzles on each side of said path intermediate the positions occupied by said conveyor rolls and means to supply tempering medium for delivery under superatmospheric pressure through said nozzles toward the opposite surfaces of said glass sheets as the latter are conveyed through said cooling area.

14. A conveyor as in claim 13, wherein said conveyor rolls are spaced longitudinally of each other a distance greater than the diameter of said conveyor rolls.

* * * * *